United States Patent
Liu et al.

(10) Patent No.: US 10,454,712 B2
(45) Date of Patent: Oct. 22, 2019

(54) ACCESS APPARATUS AND ACCESS APPARATUS-PERFORMED METHOD FOR CONNECTING USER DEVICE TO NETWORK

(71) Applicant: Huawei Technologies Co., Ltd., Shenzhen (CN)

(72) Inventors: Xiaodong Liu, Beijing (CN); Ying Jiang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 15/380,202

(22) Filed: Dec. 15, 2016

(65) Prior Publication Data
US 2017/0099161 A1    Apr. 6, 2017

Related U.S. Application Data

(63) Continuation of application No. PCT/CN2015/079678, filed on May 25, 2015.

(30) Foreign Application Priority Data

Jun. 16, 2014 (CN) .......................... 2014 1 0267012

(51) Int. Cl.
*H04L 12/64* (2006.01)
*H04L 29/12* (2006.01)
(Continued)

(52) U.S. Cl.
CPC .......... *H04L 12/64* (2013.01); *H04L 12/4633* (2013.01); *H04L 12/66* (2013.01);
(Continued)

(58) Field of Classification Search
CPC ..... H04L 12/4633; H04L 12/64; H04L 12/66; H04L 29/12; H04L 61/2007; H04L 61/2592; H04L 69/14
See application file for complete search history.

(56) References Cited

U.S. PATENT DOCUMENTS 7,006,472 B1    2/2006    Immonen et al.
7,139,275 B1    11/2006   Vyas
(Continued)

FOREIGN PATENT DOCUMENTS

CN    1859292 A      11/2006
CN    103477605 A    12/2013
(Continued)

*Primary Examiner* — Asad M Nawaz
*Assistant Examiner* — Kai Chang
(74) *Attorney, Agent, or Firm* — Slater Matsil, LLP (57) ABSTRACT

The present application discloses a method for connecting a user device to a network. The access apparatus may obtain a first IP address from a fixed broadband network and a second IP address from a mobile broadband network, where the first IP address corresponds to a fixed broadband network link, and the second IP address corresponds to a radio link. The access apparatus receives a first packet from a user device, where a source IP address of the first packet is an IP address of the user device. The access apparatus obtains a translated IP address according to a service type of the first packet. The access apparatus obtains a second packet by replacing the source IP address of the first packet with the translated IP address, and sends the second packet to a link corresponding to the translated IP address.

16 Claims, 3 Drawing Sheets

(51) Int. Cl.
*H04L 12/46* (2006.01)
*H04L 12/66* (2006.01)
*H04L 29/06* (2006.01)

(52) U.S. Cl.
CPC .......... *H04L 29/12* (2013.01); *H04L 61/2007* (2013.01); *H04L 61/2592* (2013.01); *H04L 69/14* (2013.01)

(56) References Cited

U.S. PATENT DOCUMENTS

| | | | | |
|---|---|---|---|---|
| 7,724,752 | B1* | 5/2010 | Shen | H04L 29/12509 370/328 |
| 7,827,304 | B2* | 11/2010 | Park | H04L 12/4633 370/351 |
| 9,054,943 | B2* | 6/2015 | Yengalasetti | G06F 9/5044 |
| 9,712,374 | B1* | 7/2017 | Cao | H04L 29/08072 |
| 2006/0159088 | A1* | 7/2006 | Aghvami | H04L 45/24 370/389 |
| 2008/0002670 | A1* | 1/2008 | Bugenhagen | H04L 12/66 370/352 |
| 2008/0095144 | A1* | 4/2008 | Goldberg | H04L 12/66 370/352 |
| 2009/0073987 | A1* | 3/2009 | Li | H04L 29/12462 370/395.31 |
| 2011/0242975 | A1* | 10/2011 | Zhao | H04L 29/12216 370/230 |
| 2012/0005323 | A1 | 1/2012 | Li et al. | |
| 2012/0082110 | A1* | 4/2012 | Su | H04L 45/00 370/329 |
| 2012/0099601 | A1* | 4/2012 | Haddad | H04L 29/12405 370/401 |
| 2014/0122710 | A1* | 5/2014 | Lu | H04L 67/145 709/224 |
| 2014/0129839 | A1* | 5/2014 | So | H04L 61/2514 713/171 |
| 2014/0140213 | A1* | 5/2014 | Raleigh | H04L 67/2804 370/235 |
| 2014/0223538 | A1* | 8/2014 | Van De Velde | H04L 12/2867 726/12 |
| 2014/0233564 | A1* | 8/2014 | Lue | H04L 45/50 370/392 |
| 2014/0297844 | A1* | 10/2014 | Kancherla | H04L 43/0894 709/224 |
| 2015/0359033 | A1* | 12/2015 | Stojanovski | H04W 74/02 370/328 |
| 2015/0381484 | A1* | 12/2015 | Hira | H04L 45/64 370/390 |
| 2016/0164699 | A1 | 6/2016 | Ma et al. | |

FOREIGN PATENT DOCUMENTS

| | | | |
|---|---|---|---|
| CN | 103650424 A | 3/2014 | |
| EP | 2897417 A1 * | 7/2015 | H04W 48/08 |

* cited by examiner

ACCESS APPARATUS AND ACCESS APPARATUS-PERFORMED METHOD FOR CONNECTING USER DEVICE TO NETWORK

CROSS-REFERENCE TO RELATED APPLICATIONS

This application is a continuation of International Application No. PCT/CN2015/079678, filed on May 25, 2015, which claims priority to Chinese Patent Application No. 201410267012.0, filed on Jun. 16, 2014. The disclosures of the aforementioned applications are hereby incorporated by reference in their entireties.

TECHNICAL FIELD

Embodiments of the present invention relate to communications technologies, and in particular, to an access apparatus and a method, performed by the access apparatus, for connecting a user device to a network.

BACKGROUND

Hybrid access (HA) refers to binding bandwidth of multiple available access media without reconstructing an access line, so as to increase bandwidth of the access line. For example, a radio link and an x digital subscriber line (xDSL) are bound to increase bandwidth of the xDSL.

A general hybrid access method includes deploying, on an Internet Protocol (IP) network, a device that is used to receive a packet transmitted on the radio link and the xDSL. The device may be referred to as an aggregation gateway. Two Generic Routing Encapsulation (GRE) tunnels are established between a user-side gateway and the aggregation gateway. The aggregation gateway binds one of the two GRE tunnels to the radio link. The aggregation gateway binds the other one of the two GRE tunnels to the xDSL. The user-side gateway sends a packet to the aggregation gateway by using the two GRE tunnels.

SUMMARY

In view of this, embodiments of the present invention provide an access apparatus, and a method, performed by the access apparatus, for connecting a user device to a network, which may implement access to a network by using a radio link and a fixed broadband network link without using a GRE tunnel.

The technical solutions provided in the embodiments of the present invention are as follows.

According to a first aspect, a method, performed by an access apparatus, for connecting a user device to a network is provided, where the access apparatus has a first IP address and a second IP address, the first IP address is an IP address obtained by the access apparatus from a fixed broadband (fixed broadband) network, the first IP address corresponds to a fixed broadband network link, the second IP address is an IP address obtained by the access apparatus from a mobile broadband network, and the second IP address corresponds to a radio link. The method includes receiving, by the access apparatus, a first packet from a user device, where a source IP address of the first packet is an IP address of the user device. The method also includes obtaining, by the access apparatus, a translated IP address according to a service type of the first packet, where the translated IP address is either of the first IP address and the second IP address. The method also includes obtaining, by the access apparatus, a second packet by replacing the source IP address of the first packet with the translated IP address. The method also includes sending, by the access apparatus, the second packet to a link corresponding to the translated IP address.

In a first possible implementation manner of the foregoing first aspect, the service type of the first packet is a first service type or a second service type, where the first service type is a type of a high priority service determined according to quality of service (QoS), and the second service type is a type of a low priority service determined according to the QoS.

With reference to the foregoing first possible implementation manner of the first aspect, a second possible implementation manner of the first aspect is further provided, where the obtaining a translated IP address includes: when the service type of the first packet is the first service type, determining, by the access apparatus, that the translated IP address is the first IP address; and/or when the service type of the first packet is the second service type, determining, by the access apparatus, that the translated IP address is the second IP address.

With reference to the foregoing first possible implementation manner of the first aspect, a third possible implementation manner of the first aspect is further provided, where the method further includes: obtaining, by the access apparatus, utilization of the fixed broadband network link. The obtaining, by the access apparatus, a translated IP address according to a service type of the first packet includes, when the service type of the first packet is the first service type, and the utilization of the fixed broadband network link is higher than a first threshold, determining, by the access apparatus, that the translated IP address is the second IP address.

With reference to the foregoing third possible implementation manner of the first aspect, a fourth possible implementation manner of the first aspect is further provided, where the obtaining, by the access apparatus, a translated IP address according to a service type of the first packet further includes: when the service type of the first packet is the second service type, and the utilization of the fixed broadband network link is lower than a second threshold, determining, by the access apparatus, that the translated IP address is the first IP address, where the second threshold is less than or equal to the first threshold.

With reference to the foregoing first aspect or any one of the foregoing possible implementation manners of the first aspect, a fifth possible implementation manner of the first aspect is further provided, where a source port of the first packet is a port of the user device, and the obtaining, by the access apparatus, a second packet by replacing the source IP address of the first packet with the translated IP address includes: selecting, by the access apparatus, a port from ports of the access apparatus, and obtaining the second packet by replacing the source port of the first packet with the selected port and by replacing the source IP address of the first packet with the translated IP address, where a source IP address of the second packet is the translated IP address, and a source port of the second packet is the selected port.

With reference to the foregoing fifth possible implementation manner of the first aspect, a sixth possible implementation manner of the first aspect is further provided, where the method further includes: storing, by the access apparatus, a correspondence, where the correspondence includes the source IP address of the first packet, the source IP address of the second packet, the source port of the first packet, and the source port of the second packet.

With reference to the foregoing sixth possible implementation manner of the first aspect, a seventh possible implementation manner of the first aspect is further provided, where the method further includes: receiving, by the access apparatus, a third packet by using the fixed broadband network link or the radio link, where a destination IP address of the third packet is the source IP address of the second packet, and a destination port of the third packet is the source port of the second packet; obtaining, by the access apparatus, a fourth packet according to the stored correspondence by replacing the destination IP address of the third packet with the source IP address of the first packet and by replacing the destination port of the third packet with the source port of the first packet; and sending, by the access apparatus, the fourth packet to the user device.

According to a second aspect, an access apparatus is provided, where the access apparatus has a first IP address and a second IP address, the first IP address is an IP address obtained by the access apparatus from a fixed broadband network, the first IP address corresponds to a fixed broadband network link, the second IP address is an IP address obtained by the access apparatus from a mobile broadband network, and the second IP address corresponds to a radio link. The apparatus includes: a receiving unit, configured to receive a first packet from a user device, where a source IP address of the first packet is an IP address of the user device; an address obtaining unit, configured to obtain a translated IP address according to a service type of the first packet, where the translated IP address is either of the first IP address and the second IP address. The apparatus also includes a packet obtaining unit, configured to obtain a second packet by replacing the source IP address of the first packet with the translated IP address. The apparatus also includes a sending unit, configured to send the second packet to a link corresponding to the translated IP address.

In a first possible implementation manner of the foregoing second aspect, the service type of the first packet is a first service type or a second service type, the first service type is a type of a high priority service determined according to QoS, and the second service type is a type of a low priority service determined according to the QoS.

With reference to the foregoing first possible implementation manner of the second aspect, a second possible implementation manner of the second aspect is further provided, where the address obtaining unit is specifically configured to: when the service type of the first packet is the first service type, determine that the translated IP address is the first IP address; and/or the address obtaining unit is specifically configured to: when the service type of the first packet is the second service type, determine that the translated IP address is the second IP address.

With reference to the foregoing first possible implementation manner of the second aspect, a third possible implementation manner of the second aspect is further provided, where the apparatus further includes a bandwidth obtaining unit; the bandwidth obtaining unit is configured to obtain utilization of the fixed broadband network link; and the address obtaining unit is specifically configured to: when the service type of the first packet is the first service type, and the utilization of the fixed broadband network link is higher than a first threshold, determine that the translated IP address is the second IP address.

With reference to the foregoing third possible implementation manner of the second aspect, a fourth possible implementation manner of the second aspect is further provided, where the address obtaining unit is further specifically configured to: when the service type of the first packet is the second service type, and the utilization of the fixed broadband network link is lower than a second threshold, determine that the translated IP address is the first IP address, where the second threshold is less than or equal to the first threshold.

With reference to the foregoing second aspect or any one of the foregoing possible implementation manners of the second aspect, a fifth implementation manner of the second aspect is further provided, where the apparatus further includes a selection unit; the selection unit is configured to select a port from ports of the access apparatus; and the packet obtaining unit is specifically configured to obtain the second packet by replacing a source port of the first packet with the selected port and by replacing the source IP address of the first packet with the translated IP address, where the source port of the first packet is a port of the user device, a source IP address of the second packet is the translated IP address, and a source port of the second packet is the selected port.

With reference to the foregoing fifth possible implementation manner of the second aspect, a sixth possible implementation manner of the second aspect is further provided, where the apparatus further includes: a storage unit, configured to store a correspondence, where the correspondence includes the source IP address of the first packet, the source IP address of the second packet, the source port of the first packet, and the source port of the second packet.

With reference to the foregoing sixth possible implementation manner of the second aspect, a seventh possible implementation manner of the second aspect is further provided, where the apparatus further includes a first communication unit and a second communication unit; where the first communication unit is configured to receive a third packet by using the fixed broadband network link or the radio link, where a destination IP address of the third packet is the source IP address of the second packet, and a destination port of the third packet is the source port of the second packet; the packet obtaining unit is further specifically configured to obtain a fourth packet according to the stored correspondence by replacing the destination IP address of the third packet with the source IP address of the first packet and replacing the destination port of the third packet with the source port of the first packet; and the second communication unit is configured to send the fourth packet to the user device.

According to the foregoing solutions, an access apparatus in the present invention selects an IP address from a first IP address or a second IP address according to a service type of a first packet from a user device, and use the selected IP address as a translated IP address. The access apparatus obtains a second packet by replacing a source IP address of the first packet with the translated IP address. The access apparatus sends the second packet to a link corresponding to the translated IP address. If the translated IP address is the first IP address, the access apparatus sends the second packet to an interface of a fixed broadband network link. If the translated IP address is the second IP address, the access apparatus sends the second packet to an interface of a radio link. In this way, the access apparatus may select, according to the service type of the first packet, a link from the radio link and the fixed broadband network link to send the second packet without additionally establishing a GRE tunnel, which may implement access to a network by using the radio link and the fixed broadband network link, and help increase bandwidth of the fixed broadband network link.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings.

DETAILED DESCRIPTION OF ILLUSTRATIVE EMBODIMENTS

To make the purpose, technical solutions, and advantages of the embodiments of the present invention clearer, the following clearly describes the technical solutions of the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention shall fall within the protection scope of the present invention.

Figure 1:
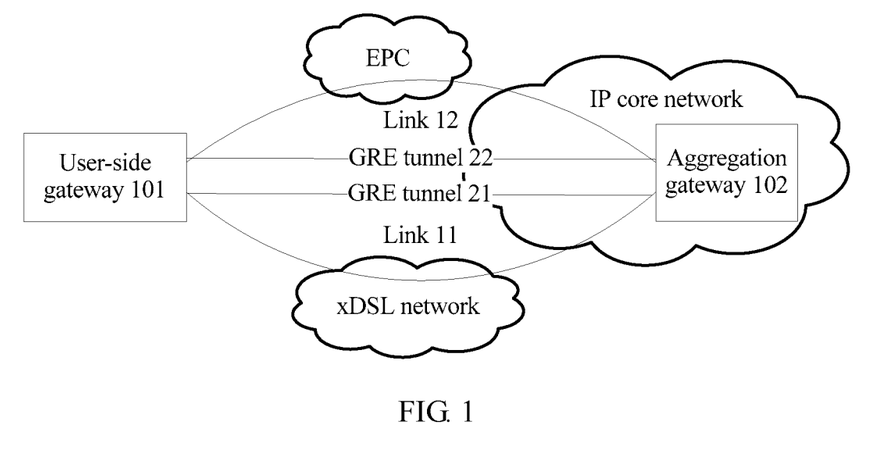
FIG. 1 is a schematic diagram of a network scenario.

FIG. 1 is a schematic diagram of a network scenario. In a network shown in FIG. 1, an aggregation gateway 102 is deployed in an IP core network. A user-side gateway 101 is configured to establish a GRE tunnel with the aggregation gateway 102. The aggregation gateway 102 is configured to receive a packet sent by the user-side gateway 101 by using the GRE tunnel.

For example, a broadband remote access server (BRAS) of an xDSL network allocates a first IP address to the user-side gateway 101. The user-side gateway 101 obtains an IP address of the aggregation gateway 102 by parsing a domain name by a domain name server (DNS). The user-side gateway 101 requests to establish a GRE tunnel 21 with the aggregation gateway 102 by using the first IP address allocated to the user-side gateway 101 and the IP address of the aggregation gateway 102. A gateway general packet radio service (GPRS) support node (GGSN) of an evolved packet core (EPC) allocates a second IP address to the user-side gateway 101. The second IP address and the first IP address are different IP addresses. The user-side gateway 101 requests to establish a GRE tunnel 22 with the aggregation gateway 102 by using the second IP address allocated to the user-side gateway 101 and the IP address of the aggregation gateway 102. The aggregation gateway 102 establishes the GRE tunnel 21 and the GRE tunnel 22 with the user-side gateway 101.

Links between the user-side gateway 101 and the aggregation gateway 102 include a link 11 and a link 12, where the link 11 belongs to a fixed broadband network link, and the link 12 belongs to a radio link. If the aggregation gateway 102 establishes the GRE tunnel 21 and the GRE tunnel 22 with the user-side gateway 101, the aggregation gateway 102 binds the GRE tunnel 21 and the link 11, and the aggregation gateway 102 binds the GRE tunnel 22 and the link 12.

The aggregation gateway 102 sends, to the user-side gateway 101 according to the Dynamic Host Configuration Protocol (DHCP), a third IP address allocated by a DHCP server to the user-side gateway 101. When the user-side gateway 101 receives a first packet sent by a user device (not shown in FIG. 1) to the IP core network, a source IP address of the first packet is an IP address of the user device. The user-side gateway 101 performs Network Address Translation, and obtains a second packet by replacing the source IP address of the first packet with the third IP address. The user-side gateway 101 may send the second packet, by means of load sharing, on the GRE tunnel 21 and the GRE tunnel 22. If the user-side gateway 101 sends the second packet through the GRE tunnel 21, the user-side gateway 101 may perform GRE encapsulation on the second packet to obtain a third packet, where a source IP address of the third packet is the first IP address, and a destination IP address of the third packet is the IP address of the aggregation gateway 102. If the user-side gateway 101 sends the second packet through the GRE tunnel 22, the user-side gateway 101 may perform GRE encapsulation on the second packet to obtain a fourth packet, where a source IP address of the fourth packet is the second IP address, and a destination IP address of the fourth packet is the IP address of the aggregation gateway 102.

Because transmission delays of the radio link and the fixed broadband network link are different, out-of-order may occur in a packet sent by the user-side gateway 101 to the aggregation gateway 102. To resolve a packet out-of-order problem caused by the different transmission delays of the radio link and the fixed broadband network link, the user-side gateway 101 may identify a packet sequence number by using a GRE extension field, and the aggregation gateway 102 and the user-side gateway 101 need to provide space for buffering a packet. The network shown in FIG. 1 implements binding of bandwidth of the radio link and bandwidth of the fixed broadband network link by using the GRE tunnel, which effectively increases bandwidth of the fixed broadband network link and implements hybrid access of the radio link and the fixed broadband network link.

In a scenario shown in FIG. 1, if the user-side gateway 101 forwards the first packet from the user device by using the radio link and the fixed broadband network link, two GRE tunnels need to be established between the user-side gateway 101 and the aggregation gateway 102. The user-side gateway 101 sends the first packet from the user device, by means of load sharing, on the two GRE tunnels. The user-side gateway 101 and the aggregation gateway 102 further need to provide relatively large space for buffering a packet.

For the foregoing problem that a user-side gateway 101 needs to implement hybrid access to a network by using a GRE tunnel, a method for implementing access to a network by using a radio link and a fixed broadband network link without using a GRE tunnel is put forward. In this method, an access apparatus 103 that is deployed on a user side has a first IP address and a second IP address, where the first IP address is an IP address obtained by the access apparatus 103 from a fixed broadband network, the first IP address corresponds to a fixed broadband network link, the second IP address is an IP address obtained by the access apparatus 103 from a mobile broadband network, and the second IP address corresponds to a radio link. The access apparatus 103 receives a first packet from a user device, where a source IP address of the first packet is an IP address of the user device. The access apparatus 103 obtains a translated IP address according to a service type of the received first packet, where the translated IP address corresponds to the service type of the first packet, and the translated IP address may be an IP address of the first IP address and the second IP address. The access apparatus 103 obtains a second packet by replacing the source IP address of the first packet with the translated IP address. The access apparatus 103 sends the second packet to a link corresponding to the translated IP address. In this way, the access apparatus 103 does not need to establish a GRE tunnel that is used to send the second packet, and the access apparatus 103 may select, according to the service type of the first packet, a link from the radio link and the fixed broadband network link to send the second packet.

Figure 2:
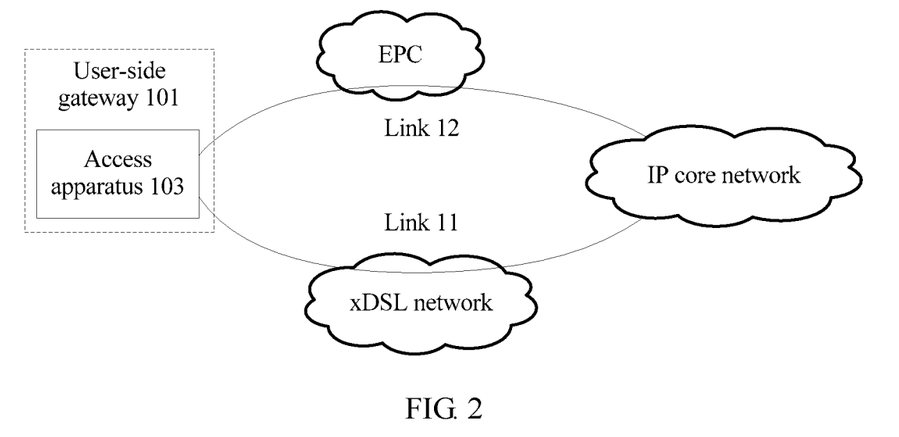
FIG. 2 is a schematic diagram of a network scenario according to an embodiment of the present invention.

FIG. 2 is a schematic diagram of a network scenario according to an embodiment of the present invention. In a network shown in FIG. 2, that a mobile broadband network is an EPC, and a fixed broadband network is an xDSL network is merely used as an example. The mobile broadband network in this embodiment of the present invention may further be another-type mobile broadband network except the EPC, and the fixed broadband network may further be another-type fixed broadband network except the xDSL network, which are not described by using examples one by one herein.

In the network shown in FIG. 2, an access apparatus 103 may be deployed in a user-side gateway 101. A gateway of the fixed broadband network, such as a BRAS (not shown in FIG. 2) of the xDSL network may allocate a first IP address to the access apparatus 103. A link 11 exists between the BRAS and the access apparatus 103, where the link 11 belongs to a fixed broadband network link, and the first IP address corresponds to an interface of the link 11. A gateway of the mobile broadband network, such as a GGSN (not shown in FIG. 2) of the EPC may allocate a second IP address to the access apparatus 103, where the second IP address is different from the first IP address. A link 12 exists between the GGSN and the access apparatus 103, where the link 12 belongs to a radio link, and the second IP address corresponds to an interface of the link 12.

The access apparatus 103 stores the first IP address and a service type corresponding to the first IP address. The access apparatus 103 further stores the second IP address and a service type corresponding to the second IP address. The access apparatus 103 receives a first packet from a user device (not shown in FIG. 2), and obtains a service type of the first packet. A source IP address of the first packet is an IP address of the user device. The access apparatus 103 selects, according to the service type of the first packet, an IP address from the first IP address and the second IP address that are allocated to the access apparatus 103. The selected IP address is a translated IP address. The service type corresponding to the first IP address may be different from the service type corresponding to the second IP address. Alternatively, there may be partial service types that are the same between the service type corresponding to the first IP address and the service type corresponding to the second IP address may be the same. If a priority of the first IP address is higher than that of the second IP address, the access apparatus 103 may preferentially select the first IP address as an IP address corresponding to the partial service types. If the priority of the second IP address is higher than that of the first IP address, the access apparatus 103 may preferentially select the second IP address as an IP address corresponding to the partial service types.

The access apparatus 103 obtains a second packet by replacing the source IP address of the first packet with the translated IP address, which omits an operation of obtaining a third IP address in a scenario shown in FIG. 1.

The access apparatus 103 sends the second packet to a link corresponding to the translated IP address. For example, the access apparatus 103 may store a correspondence between the first IP address and the interface of the link 11, and a correspondence between the second IP address and the interface of the link 12. Before or upon obtaining the first IP address, the access apparatus 103 may obtain an IP address of the gateway of the fixed broadband network, for example, an IP address of the BRAS. Before or upon obtaining the second IP address, the access apparatus 103 may obtain an IP address of the gateway of the mobile broadband network, for example, an IP address of the GGSN. If the translated IP address is the first IP address, the access apparatus 103 sends the second packet to the BRAS according to the IP address of the BRAS by using the interface of the link 11 corresponding to the first IP address. If the translated IP address is the second IP address, the access apparatus 103 sends the second packet to the GGSN according to the IP address of the GGSN by using the interface of the link 12 corresponding to the second IP address.

Optionally, the access apparatus 103 may store a correspondence between the first IP address and first forwarding information, and a correspondence between the second IP address and second forwarding information. An outbound interface included in the first forwarding information is the interface of the link 11, and a next hop included in the first forwarding information is the IP address of the BRAS. An outbound interface included in the second forwarding information is the interface of the link 12, and a next hop included in the second forwarding information is the IP address of the GGSN. The access apparatus 103 may send, according to forwarding information corresponding to a determined translated IP address, the second packet to a next hop included in the forwarding information. In this way, the access apparatus 103 selects, according to a service type, a link meeting a service requirement to send the second packet, without establishing a GRE tunnel.

Optionally, the first forwarding information may be stored, in an entry, with the first IP address and the service type corresponding to the first IP address, and the second forwarding information may be stored, in an entry, with the second IP address and the service type corresponding to the second IP address. Alternatively, a service type and an IP address corresponding to the service type are stored in a first table, where the first table includes the first IP address, the service type corresponding to the first IP address, the second IP address, and the service corresponding to the second IP address; forwarding information and an IP address corresponding to the forwarding information are stored in a second table, where the second table includes the first IP address, the first forwarding information corresponding to the first IP address, the second IP address, and the second forwarding information corresponding to the second IP address.

Figure 3:
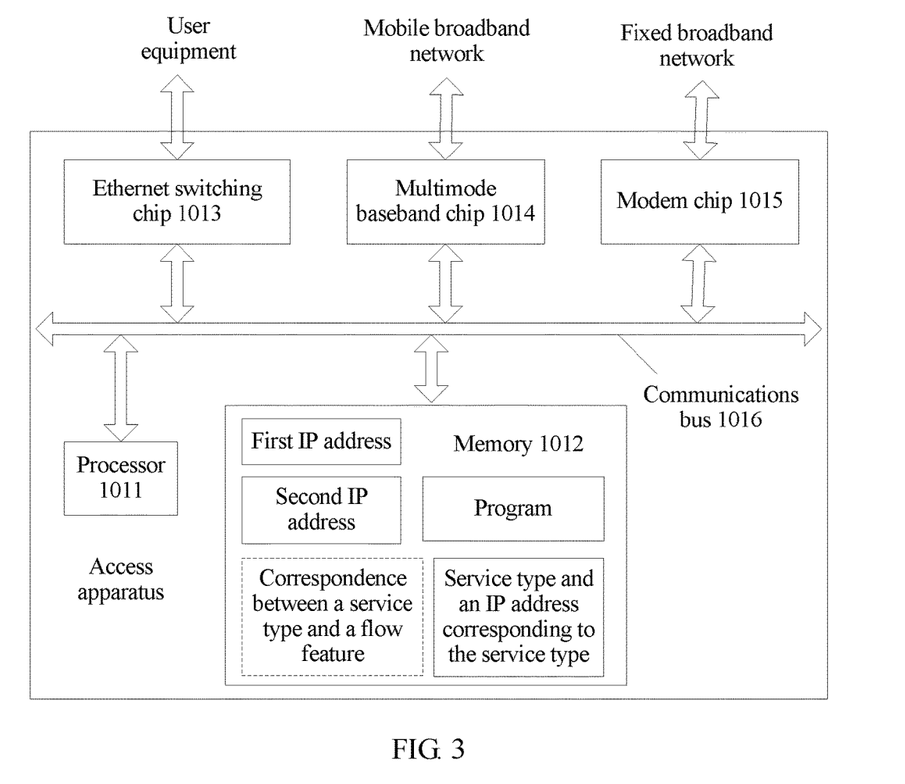
FIG. 3 is a schematic diagram of an access apparatus according to an embodiment of the present invention.

FIG. 3 is a schematic diagram of an access apparatus according to an embodiment of the present invention. The access apparatus shown in FIG. 3 may be deployed in a user-side gateway 101, or the access apparatus is connected to a user-side gateway 101. The access apparatus shown in FIG. 3 includes a processor 1011, a memory 1012, an Ethernet switching chip 1013, a multimode baseband chip 1014, and a modem chip 1015. The Ethernet switching chip 1013, the multimode baseband chip 1014, and the modem chip 1015 may be integrated in one or two chips. The processor 1011, the memory 1012, the Ethernet switching chip 1013, the multimode baseband chip 1014, and the modem chip 1015 are connected through a communications bus 1016. The processor 1011 may include at least one physical processor. If the access apparatus is a device such as a router or a server, the processor 1011 may be a central processing unit (CPU). If the access apparatus is a switch, the processor 1011 may be a network processor (NP).

The processor 1011 may write a first IP address obtained by using the modem chip 1015 and a second IP address obtained by using the multimode baseband chip 1014 into the memory 1012. The first IP address may be an IP address obtained by the access apparatus shown in FIG. 3 from a gateway of a fixed broadband network, for example, the first IP address may be an IP address obtained by the processor 1011 from a BRAS of an xDSL network. The second IP address may be an IP address obtained by the access apparatus shown in FIG. 3 from a gateway of a mobile broadband network, for example, the second IP address may be an IP address obtained by the processor 1011 from a GGSN of an EPC.

The memory 1012 may further store a service type corresponding to the first IP address and a service type corresponding to the second IP address. The service type may be a type of a high priority service determined according to QoS, for example, a voice service, a game service, and a domain name service, or the service type may be a type of a low priority service determined according to the QoS, for example, a video service, an email service, a file transfer service, and a World Wide Web service. As shown in Table 1, the first IP address may correspond to the high priority service determined according to the QoS, and the second IP address may correspond to the low priority service determined according to the QoS. Table 1 may serve as a specific representation form of a service type and an IP address corresponding to the service type that are stored in the memory 1012, but the specific representation form is not limited to such a form.

TABLE 1

| IP address | Service type |
|---|---|
| First IP address | Voice |
| First IP address | Game |
| Second IP address | Video |
| Second IP address | Email |

Optionally, the memory 1012 may further store a flow feature corresponding to a service type. A service type and a flow feature corresponding to the service type may be stored in a table. A feature extracted by the processor 1011 from a first packet received by the Ethernet switching chip 1013 is a flow feature. The flow feature may be at least one of a protocol type, a port number, a length of the packet, or a destination IP address. The processor 1011 may obtain a service type according to the flow feature extracted from the first packet and a flow feature, corresponding to the service type, stored in the memory 1012. The processor 1011 uses the obtained service type as a service type of the first packet. Alternatively, the memory 1012 may store a flow feature corresponding to the first IP address and a flow feature corresponding to the second IP address. The processor 1011 may obtain, according to the flow feature extracted from the first packet and the flow feature, stored in the memory 1012, corresponding to the IP address, an IP address corresponding to the flow feature extracted from the first packet. Because the flow feature extracted from the first packet may indicate the service type of the first packet, an IP address, obtained by the processor 1011, corresponding to a flow feature is an IP address corresponding to the service type of the first packet.

The memory 1012 may further store a correspondence between a translated IP address and an interface of a link. For example, the memory 1012 stores the first IP address, an interface of a link 11 corresponding to the first IP address, the second IP address, and an interface of a link 12 corresponding to the second IP address. The interface of the link 11 may be an interface, on an access apparatus 103, corresponding to the link 11. The interface, on the access apparatus 103, corresponding to the link 11 may be an interface included in the modem chip 1015. An interface of the link 12 may be an interface, on the access apparatus 103, corresponding to the link 12. The interface, on the access apparatus 103, corresponding to the link 12 may be an interface included in the multimode baseband chip 1014.

The memory 1012 stores a program. The processor 1011 performs the following operations according to an executable instruction included in the program read from the memory 1012.

The processor 1011 receives the first packet from a user device by using the Ethernet switching chip 1013.

The processor 1011 obtains a translated IP address according to the service type of the first packet, and the service type corresponding to the first IP address and the service type corresponding to the second IP address that are in the memory 1012, where the translated IP address corresponds to the service type of the first packet, and the translated IP address is the first IP address or the second IP address.

The processor 1011 obtains a second packet by replacing a source IP address of the first packet with the translated IP address, where the source IP address of the first packet is an IP address of the user device. Alternatively, the processor 1011 obtains a second packet by replacing a source port of the first packet with a selected port and by replacing a source IP address of the first packet with the translated IP address, where the port selected by the processor 1011 may be a port of idle ports of the access apparatus 103, and the source port of the first packet is a port of the user device.

Optionally, the processor 1011 may store, in the memory 1012, a correspondence between the source IP address of the first packet and a source IP address of the second packet, and a correspondence between the source port of the first packet and a source port of the second packet. Optionally, the processor 1011 may store, in the memory 1012, a correspondence between the source IP address of the first packet, the source port of the first packet, and a protocol number, and the source IP address of the second packet and the source port of the second packet. The protocol number may be a protocol number acquired by the processor 1011 from the first packet.

The processor 1011 sends the second packet to a link corresponding to the translated IP address. For example, if the translated IP address is the second IP address, the processor 1011 may send the second packet to the link 12 by using the multimode baseband chip 1014. If the translated IP address is the first IP address, the processor 1011 may send the second packet to the link 11 by using the modem chip 1015.

Figure 5:
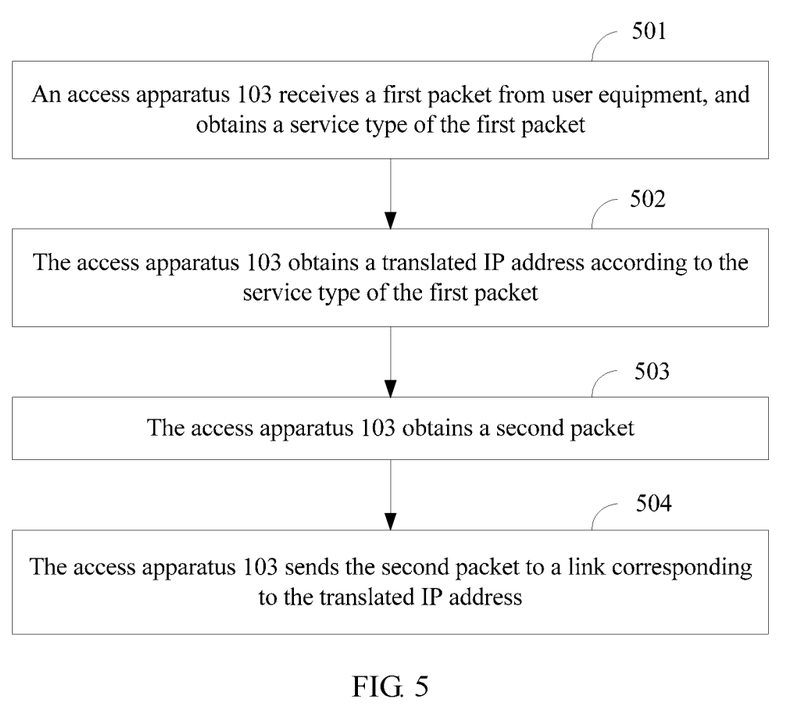
FIG. 5 is a flowchart of a method, performed by an access apparatus, for connecting a user device to a network according to an embodiment of the present invention.

Further, the processor 1011 enables, according to the executable instruction, the service type corresponding to the first IP address, and the service type corresponding to the second IP address that are in the memory 1012, the access apparatus in FIG. 3 to perform all operations performed by an access apparatus in an embodiment shown in FIG. 5. Alternatively, it may be considered that the access apparatus shown in FIG. 3 is the access apparatus in the embodiment shown in FIG. 5.

Figure 4:
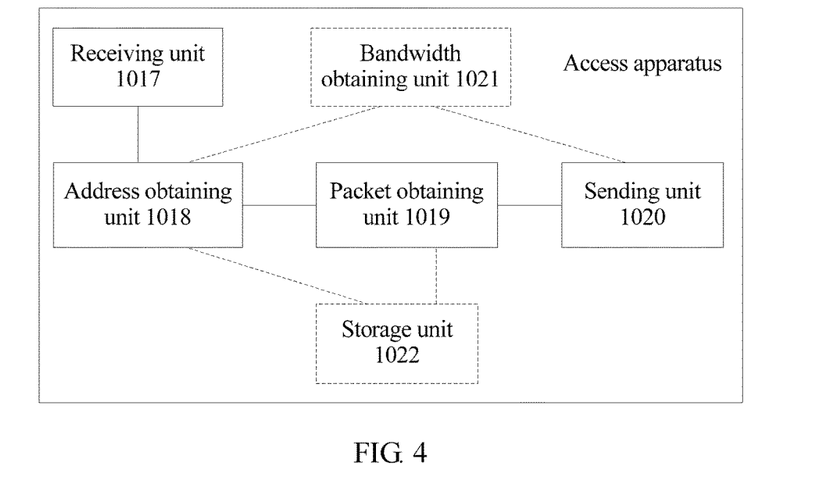
FIG. 4 is a schematic diagram of an access apparatus according to an embodiment of the present invention.

FIG. 4 is a schematic diagram of an access apparatus according to an embodiment of the present invention. The access apparatus shown in FIG. 4 includes a receiving unit 1017, an address obtaining unit 1018, a packet obtaining unit 1019, and a sending unit 1020. Optionally, the access apparatus shown in FIG. 4 further includes a bandwidth obtaining unit 1021 and a storage unit 1022.

The access apparatus shown in FIG. 4 and the access apparatus shown in FIG. 3 may be a same apparatus, for example, may both be the access apparatus 103 in the network shown in FIG. 2. It may be considered that FIG. 3 shows, from a physical perspective, a structure included in an access apparatus. However, FIG. 4 shows, from a logical perspective, a structure included in an access apparatus. Optionally, the receiving unit 1017 in FIG. 4 may be implemented by the Ethernet switching chip 1013 in FIG. 3. If the sending unit 1020 in FIG. 4 sends a second packet to a link 11, the sending unit 1020 in FIG. 4 may be implemented by the modem chip 1015 in FIG. 3. If the sending unit 1020 in FIG. 4 sends a second packet to a link 12, the sending unit 1020 in FIG. 4 may be implemented by the multimode baseband chip 1014 in FIG. 3; the storage unit 1022 in FIG. 4 may be implemented by the memory 1012 in FIG. 3; the address obtaining unit 1018, the packet obtaining unit 1019, and the bandwidth obtaining unit 1021 in FIG. 4 may be implemented by the processor 1011 in FIG. 3 according to an executable instruction, a service type corresponding to a first IP address, and a service type corresponding to a second IP address that are stored in the memory 1012.

FIG. 5 is a flowchart of a method, performed by an access apparatus, for connecting a user device to a network according to an embodiment of the present invention. With reference to FIG. 2 to FIG. 4, the following describes in details the method, performed by the access apparatus, for connecting a user device to a network according to this embodiment of the present invention.

501. An access apparatus 103 receives a first packet from a user device, and obtains a service type of the first packet.

For example, a receiving unit 1017 receives the first packet from the user device, and sends the first packet to an address obtaining unit 1018. The address obtaining unit 1018 may obtain the service type of the first packet. For example, a storage unit 1022 may store a flow feature corresponding to a service type. The flow feature may be at least one of a protocol type, a port number, a length of a packet, or a destination IP address. The address obtaining unit 1018 may extract a flow feature from the first packet received by the receiving unit 1017. The address obtaining unit 1018 may obtain, according to the extracted flow feature, the service type corresponding to the first packet from the storage unit 1022. Alternatively, a field in the first packet stores a parameter used to identify the service type of the first packet. The address obtaining unit 1018 may learn a field, in which a parameter used to identify a service type is located, in the first packet, and the service type identified by the parameter. A value of the parameter included in the first packet indicates that the service type is one of service types such as a voice service, a video service, and an email service. The address obtaining unit 1018 may obtain the service type of the first packet according to the value of the parameter included in the first packet. The address obtaining unit 1018 may be implemented by using a traffic analyzer.

For example, the address obtaining unit 1018 may determine, according to a protocol number in the first packet, that the first packet is a User Datagram Protocol (UDP) packet. The address obtaining unit 1018 may determine, according to a fact that the first packet is a UDP packet and a destination port number of the first packet is 5060, that the service type of the first packet is a voice service. The address obtaining unit 1018 may determine, according to the protocol number in the first packet, that the first packet is a Transmission Control Protocol (TCP) packet. The address obtaining unit 1018 may determine, according to a fact that the first packet is a TCP packet and the destination port number of the first packet is 80 or 8080, that the service type of the first packet is a World Wide Web service.

502. The access apparatus 103 obtains a translated IP address according to the service type of the first packet.

The service type mentioned in this embodiment of the present invention is a first service type or a second service type. The first service type is a type of a high priority service determined according to QoS. For example, the first service type may be a low-delay or low-bandwidth service. The first service type may be one of services such as a voice service and a domain name service. The second service type is a type of a low priority service determined according to the QoS. For example, the second service type may be a high-delay or high-bandwidth service. The second service type may be one of services such as a video service, a file transfer service, and an email service.

For example, the storage unit 1022 may store a first IP address and a service type corresponding to the first IP address. The storage unit 1022 may further store a second IP address and a service type corresponding to the second IP address. The service type corresponding to the first IP address may be a first service, and the service corresponding to the second IP address may be a second service. If the service type, obtained by the address obtaining unit 1018, of the first packet is the first service, the address obtaining unit 1018 may use the first IP address corresponding to the first service as the translated IP address. If the service type, obtained by the address obtaining unit 1018, of the first packet is the second service, the address obtaining unit 1018 may use the second IP address corresponding to the second service as the translated IP address. The address obtaining unit 1018 sends the translated IP address to a packet obtaining unit 1019.

503. The access apparatus 103 obtains a second packet.

For example, the packet obtaining unit 1019 obtains the second packet by replacing a source IP address of the first packet with the translated IP address, where the source IP address of the first packet is an IP address of the user device. Alternatively, the packet obtaining unit 1019 may select a port from ports of the access apparatus 103, where the selected port is an idle port. The packet obtaining unit 1019 obtains the second packet by replacing a source port of the first packet with the selected port and by replacing the source IP address of the first packet with the translated IP address, where the source port of the first packet is a port of the user device. A destination port of the second packet is the same as a destination port of the first packet, and a destination IP address of the second packet is the same as a destination IP address of the first packet.

Optionally, if the second packet is a packet obtained after the source IP address of the first packet is replaced with the translated IP address, after 503, the method further includes: storing, by the packet obtaining unit 1019 in the storage unit 1022, a correspondence between the source IP address of the first packet and a source IP address of the second packet. If the second packet is a packet obtained after the source IP address of the first packet is replaced with the translated IP address and the source port of the first packet is replaced with the selected port, after 503, the method further includes: storing, by the packet obtaining unit 1019 in the storage unit 1022, a correspondence between the source IP address of the first packet and a source IP address of the second packet, and a correspondence between the source port of the first packet and a source port of the second packet. Optionally, the storage unit 1022 may further store the source IP address of the first packet, the source IP address of the second packet, the source port of the first packet, the source port of the second packet, and the protocol number included in the first packet.

504. The access apparatus 103 sends the second packet to a link corresponding to the translated IP address.

For example, the storage unit 1022 stores the first IP address and an interface of a link 11 corresponding to the first IP address. The storage unit 1022 further stores the second IP address and an interface of a link 12 corresponding to the second IP address. When the translated IP address obtained by the address obtaining unit 1018 is the first IP address, a sending unit 1020 may send the second packet to the interface of the link 11 by using the interface of the link 11 corresponding to the first IP address stored in the storage unit 1022. The second packet may be sent through the link 11 to a gateway of a fixed broadband network, for example, a BRAS of an xDSL network. The gateway of the fixed broadband network may send the second packet to a device corresponding to the destination IP address of the second packet. When the translated IP address obtained by the address obtaining unit 1018 is the second IP address, the sending unit 1020 may send the second packet to the interface of the link 12 by using the interface of the link 12 corresponding to the second IP address stored in the storage unit 1022. The second packet may be sent through the link 12 to a gateway of a mobile broadband network, for example, a GGSN of an EPC. The gateway of the mobile broadband network may send the second packet to a device corresponding to the destination IP address of the second packet.

For example, the storage unit 1022 stores the first IP address and first forwarding information corresponding to the first IP address. The storage unit 1022 further stores the second IP address and second forwarding information corresponding to the second IP address. An outbound interface included in the first forwarding information is the interface of the link 11. A next hop included in the first forwarding information is an IP address of the gateway of the fixed broadband network, for example, an IP address of the BRAS in the xDSL network. An outbound interface included in the second forwarding information is the interface of the link 12. A next hop included in the second forwarding information is an IP address of the gateway of the mobile broadband network, for example, an IP address of the GGSN of the EPC. When the translated IP address obtained by the address obtaining unit 1018 is the first IP address, the sending unit 1020 sends the second packet to the link 11 by using the outbound interface included in the first forwarding information. The sending unit 1020 sends the second packet to the gateway of the fixed broadband network through the link 11 according to the next hop included in the first forwarding information. When the translated IP address obtained by the address obtaining unit 1018 is the second IP address, the sending unit 1020 sends the second packet to the link 12 by using the outbound interface included in the second forwarding information. The sending unit 1020 sends the second packet to the gateway of the mobile broadband network through the link 12 according to the next hop included in the second forwarding information.

In the foregoing embodiment, an access apparatus 103 may select, according to a service type of a first packet from a user device, an IP address corresponding to the service type from a first IP address and a second IP address, and use the selected IP address as a translated IP address. The access apparatus 103 obtains a second packet by replacing a source IP address of the first packet with the translated IP address. The access apparatus 103 sends the second packet to a link corresponding to the translated IP address. In this way, it is not required to deploy an aggregation gateway or establish a GRE tunnel on an IP core network, the access apparatus 103 translates a network address from the user device and carries packets of different service types on a radio link and/or a fixed broadband network link according to the link corresponding to the translated address, which helps increase bandwidth of the fixed broadband network link.

Optionally, before 502, the method further includes: obtaining, by the access apparatus 103, utilization of the link 11. That the access apparatus 103 obtains the translated IP address in 502 specifically includes: if the utilization of the link 11 is higher than a first threshold and the service type of the first packet is the first service type, the access apparatus 103 uses the second IP address as an IP address corresponding to the first service type, that is, the access apparatus 103 selects the second IP address as the translated IP address; or if the utilization of the link 11 is lower than a second threshold and the service type of the first packet is the second service type, the access apparatus 103 selects the first IP address as an IP address corresponding to the second service type, that is, the access apparatus 103 selects the first IP address as the translated IP address, where the second threshold is less than or equal to the first threshold.

For example, after the xDSL network is accessed, a bandwidth obtaining unit 1021 obtains bandwidth information of the link 11 and collects statistics about the utilization of the link 11. When the utilization of the link 11 is higher than the first threshold, and the service type of the first packet is the first service type, the address obtaining unit 1018 selects the second IP address as the translated IP address. When the utilization of the link 11 is lower than the second threshold, and the service type of the first packet is the second service type, the address obtaining unit 1018 selects the first IP address as the translated IP address. That the service type of the first packet is a voice service is used as an example; if the first threshold is 80%, when the utilization, obtained by the bandwidth obtaining unit 1021, of the link 11 is higher than 80%, the address obtaining unit 1018 selects the second IP address as the translated IP address. In other words, the sending unit 1020 may send the second packet to the link 12 by using the interface of the link 12 corresponding to the second IP address. That the service type of the first packet is a video service is used as an example; if the second threshold is 20%, when the utilization, obtained by the bandwidth obtaining unit 1021, of the link 11 is less than 20%, the address obtaining unit 1018 selects the first IP address as the translated IP address. In other words, the sending unit 1020 may send the second packet to the link 11 by using the interface of the link 11 corresponding to the first IP address.

In the foregoing embodiment, an access apparatus may dynamically adjust, according to utilization of a link 11 and a service type of a first packet, a link that carries the first packet, which increases bandwidth utilization.

Optionally, after 504, the method further includes: sending, by the access apparatus 103, a third packet from an IP core network to the user device. A destination IP address of the third packet is the source IP address of the second packet, and a destination port of the third packet is the source port of the second packet.

For example, the access apparatus 103 may further include a first communication unit (not shown in FIG. 4) and a second communication unit (not shown in FIG. 4). The first communication unit may be implemented by using the multimode baseband chip 1014 and the modem chip 1015 in FIG. 3. The second communication unit may be implemented by using the Ethernet switching chip 1013 in FIG. 3. The first communication unit may receive the third packet from the IP core network by using the interface of the link 11 or the interface of the link 12. The first communication unit may send the third packet to the address obtaining unit 1018.

For example, the packet obtaining unit 1019 may obtain, from the storage unit 1022, the source IP address of the first packet corresponding to the source IP address of the second packet. The packet obtaining unit 1019 obtains a fourth packet by replacing the destination IP address of the third packet with the obtained source IP address of the first packet. Alternatively, the packet obtaining unit 1019 may further obtain, from the storage unit 1022, the source IP address of the first packet corresponding to the source IP address of the second packet, and the source port of the first packet corresponding to the source port of the second packet. The packet obtaining unit 1019 may obtain the fourth packet by replacing the destination IP address of the third packet with the source IP address of the first packet and by replacing the destination port of the third packet with the source port of the first packet.

For example, a destination IP address of the fourth packet is the source IP address of the first packet, and a destination port of the fourth packet is the source port of the first packet. The second communication unit may send the fourth packet to the user device according to the destination port of the fourth packet and the destination IP address of the fourth packet.

The foregoing processor may be a microprocessor or the processor may be any conventional processor. The steps of the method disclosed with reference to the embodiments of the present invention may be directly performed by a hardware processor, or may be performed by using a combination of hardware in the processor and a software module. When the steps are implemented by using software, code that implements the foregoing functions may be stored in a computer-readable medium, where the computer-readable medium includes a computer storage medium. The storage medium may be any available medium accessible to a computer. The following is used as an example but the embodiments of the present invention are not limited thereto: The computer readable medium may be a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. The computer-readable medium may be a compact disc (CD), a laser disc, a digital video disc (DVD), a floppy disk, or a Blu-ray disc.

In summary, the foregoing is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method, comprising:
   receiving, by an access apparatus, a first packet associated with a first service type and a first source IP address indicating the source IP address of the first packet;
   receiving, by the access apparatus, a second packet associated with a second service type and a second source IP address indicating the source IP address of the second packet;
   determining, by the access apparatus, a first IP address and a fixed link based on the first service type;
   determining, by the access apparatus, a second IP address and a radio link based on the second service type;
   obtaining, by the access apparatus, a third packet based on one or more actions, the one or more actions comprising replacing the first source IP address of the first packet with the first IP address, wherein the first source IP address is different from the first IP address and the second IP address;
   obtaining, by the access apparatus, a fourth packet based on one or more actions, the one or more actions comprising replacing the second source IP address of the second packet with the second IP address, wherein the second source IP address is different from the first IP address and the second IP address;
   sending, by the access apparatus, the third packet via the fixed link; and
   sending, by the access apparatus, the fourth packet via the radio link.

2. The method according to claim 1, wherein the first service type is a type of a high priority service determined according to quality of service (QoS), and the second service type is a type of a low priority service determined according to the QoS.

3. The method according to claim 2, further comprising:
   obtaining, by the access apparatus, utilization of the fixed link;
   wherein determining the first IP address based on the first service type comprises:
      determining, by the access apparatus, the first IP address based on the first service type and the utilization of the fixed link, wherein the utilization of the fixed link is lower than a first threshold.

4. The method according to claim 1, wherein a source port of the first packet is a port of device sending the first packet, and wherein obtaining the third packet based on one or more actions comprising replacing the source IP address of the first packet with the first IP address comprises:
   selecting, by the access apparatus, a port from ports of the access apparatus, and obtaining the third packet by replacing the source port of the first packet with the selected port and by replacing the source IP address of the first packet with the first IP address, wherein the source IP address of the third packet is the first IP address, and a source port of the third packet is the selected port.

5. The method according to claim 4, further comprising:
   storing, by the access apparatus, a correspondence, wherein the correspondence comprises the source IP address of the first packet, the source IP address of the third packet, the source port of the first packet, and the source port of the third packet.

6. The method according to claim 5, further comprising:
receiving, by the access apparatus, a fifth packet using the fixed link or the radio link, wherein a destination IP address of the fifth packet is the source IP address of the third packet, and a destination port of the fifth packet is the source port of the third packet;
obtaining, by the access apparatus, a sixth packet according to the stored correspondence by replacing the destination IP address of the fifth packet with the source IP address of the first packet and by replacing the destination port of the fifth packet with the source port of the first packet; and
sending, by the access apparatus, the sixth packet to the device.

7. The method according to claim 1, wherein the first source IP address is different from the second source IP address.

8. The method according to claim 1, wherein the first source IP address and the second source IP address are the same IP address.

9. An access apparatus, comprising:
a memory storing instructions, and a processor coupled to the memory to execute the instructions to:
receive a first packet associated with a first service type and a first source IP address indicating the source IP address of the first packet;
receive a second packet associated with a second service type and a second source IP address indicating the source IP address of the second packet;
determine a first IP address and a fixed link based on the first service type;
determine a second IP address and a radio link based on the second service type;
obtain a third packet by based on one or more actions comprising replacing the first source IP address of the first packet with the first IP address, wherein the first source IP address is different from the first IP address and the second IP address;
obtain a fourth packet based on one or more actions comprising replacing the second source IP address of the second packet with the second IP address, wherein the second source IP address is different from the first IP address and the second IP address;
send the third packet via the fixed link; and
send the fourth packet via the radio link.

10. The apparatus according to claim 9, wherein the first service type is a type of a high priority service determined according to quality of service (QoS), and the second service type is a type of a low priority service determined according to the QoS.

11. The apparatus according to claim 10, wherein the processor further executes instructions to:
obtain utilization of the fixed link; and
when the service type of the first packet is the first service type, and the utilization of the fixed link is lower than a first threshold, determine that the translated IP address is the second IP address.

12. The apparatus according to claim 9, wherein the processor further executes instructions to:
select a port from ports of the access apparatus; and
obtain the third packet by replacing a source port of the first packet with the selected port and by replacing the source IP address of the first packet with the first IP address, wherein the source port of the first packet is a port of a device sending the first packet, a source IP address of the third packet is the first IP address, and a source port of the third packet is the selected port.

13. The apparatus according to claim 12, wherein the processor further executes instructions to:
store a correspondence in the memory, wherein the correspondence comprises the source IP address of the first packet, the source IP address of the third packet, the source port of the first packet, and the source port of the third packet.

14. The apparatus according to claim 13, wherein the further executes instructions to:
receive a fifth packet using the fixed link or the radio link, wherein a destination IP address of the fifth packet is the source IP address of the third packet, and a destination port of the third packet is the source port of the third packet;
obtain a sixth packet according to the stored correspondence by replacing the destination IP address of the fifth packet with the source IP address of the first packet and replacing the destination port of the fifth packet with the source port of the first packet; and
send the sixth packet to the device.

15. The apparatus according to claim 9, wherein the first source IP address is different from the second source IP address.

16. The apparatus according to claim 9, wherein the first source IP address and the second source IP address are the same IP address.

* * * * *